(No Model.) 3 Sheets—Sheet 1.
J. B. GRADY.
FISH CUTTER.
No. 266,134. Patented Oct. 17, 1882.
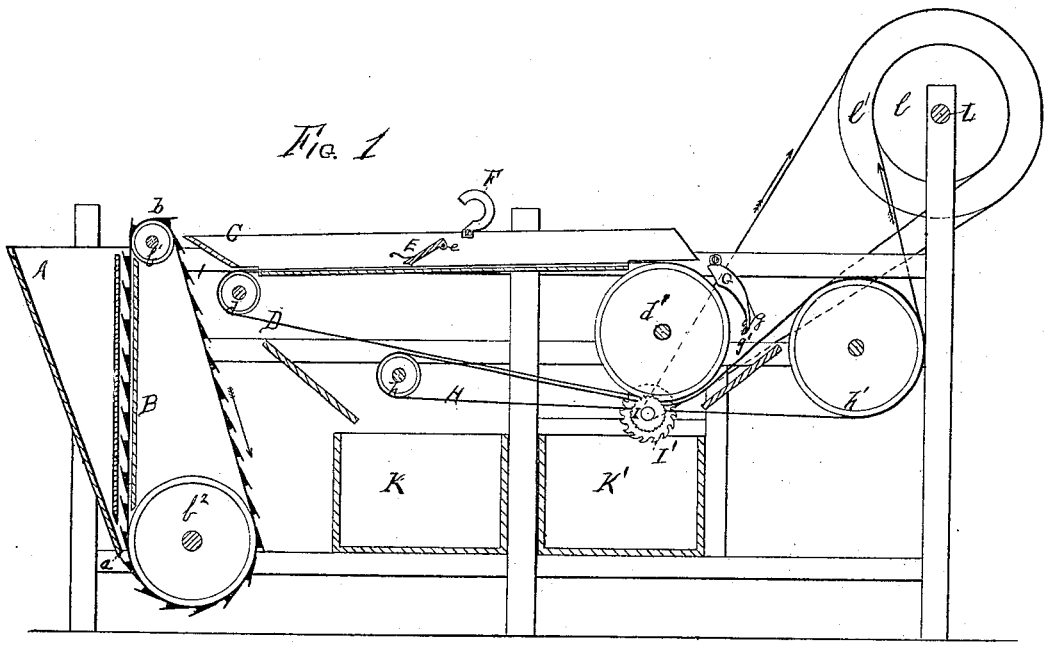
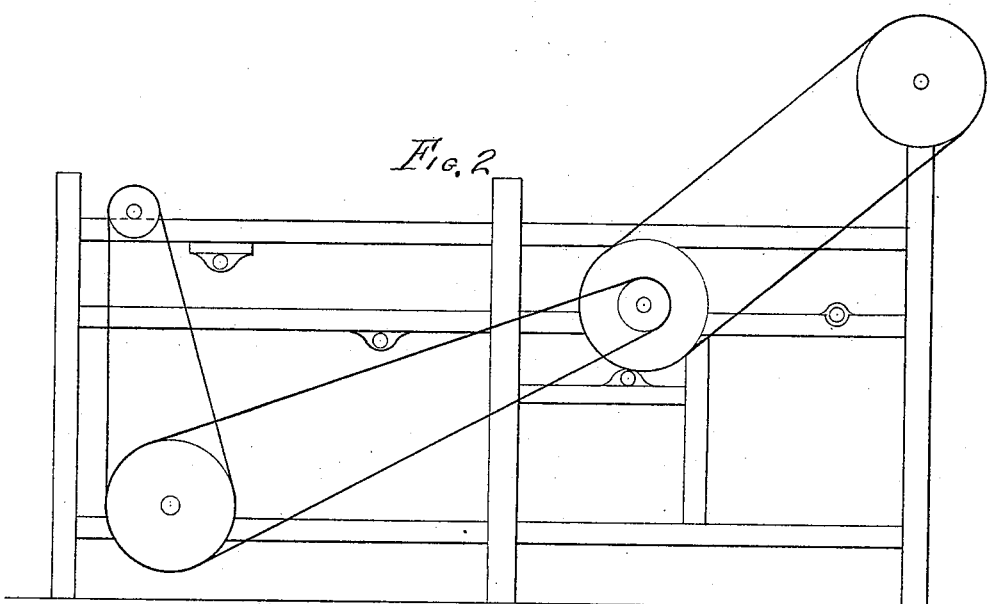
WITNESSES:
Will H. Powell.
G. Connolly.
INVENTOR
James B. Grady,
By Connolly Bros.
ATTORNEYS (No Model.)  3 Sheets—Sheet 2.
J. B. GRADY.
FISH CUTTER.
No. 266,134. Patented Oct. 17, 1882.
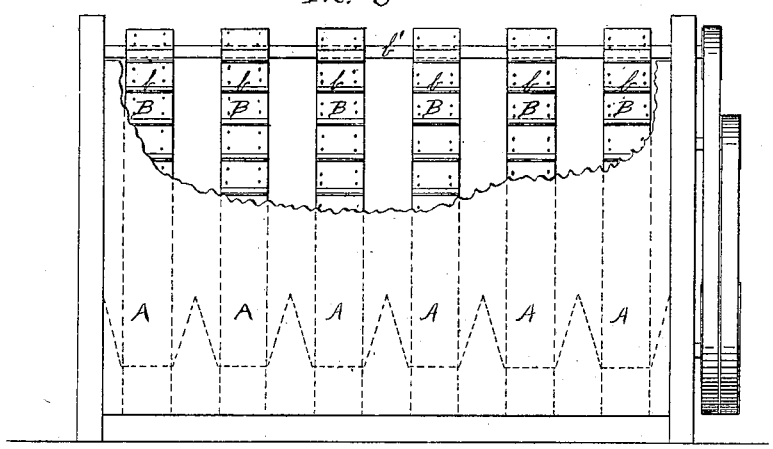
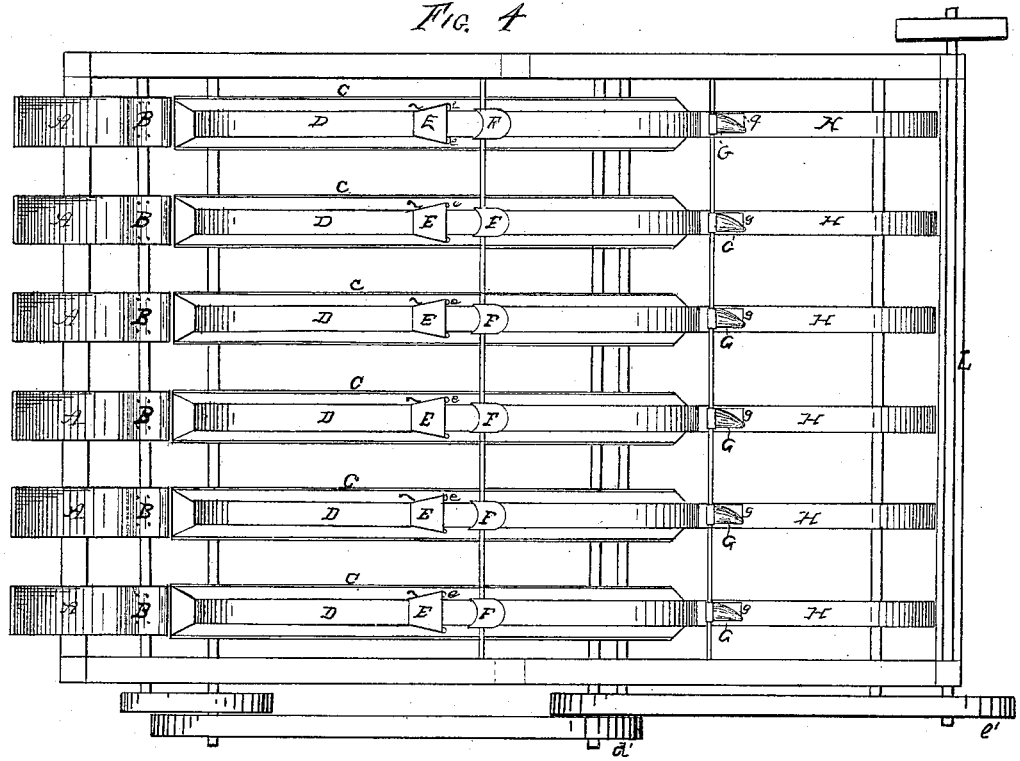
WITNESSES:
INVENTOR
James B. Grady
By Connolly Bros
ATTORNEYS (No Model.) 3 Sheets—Sheet 3.
J. B. GRADY.
FISH CUTTER.
No. 266,134. Patented Oct. 17, 1882.
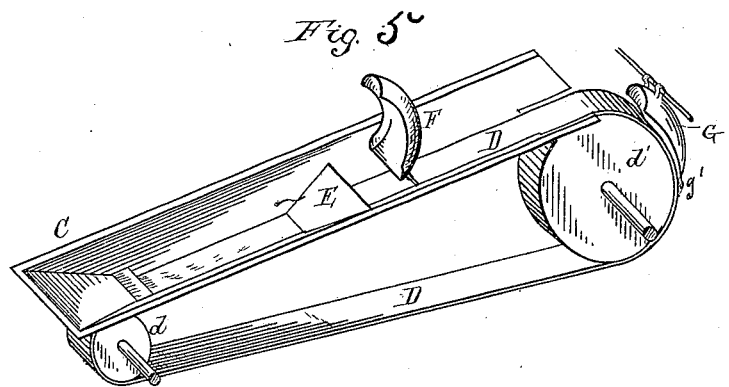
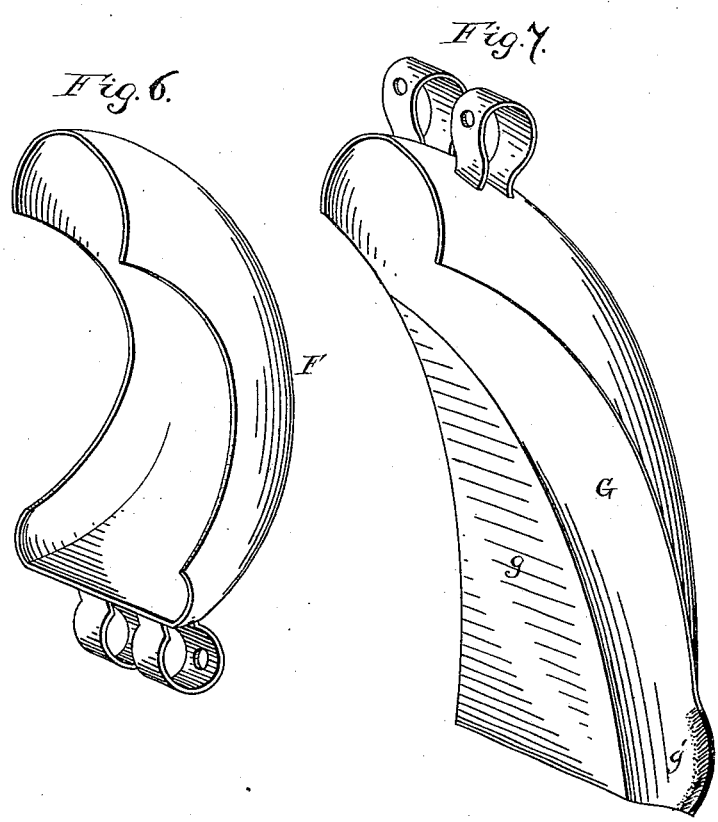
Witnesses:
J. W. Garner
J. B. Connolly
Inventor:
James B. Grady
By Connolly Bros.
Attorneys.

United States Patent Office.

JAMES B. GRADY, OF PHILADELPHIA, PENNSYLVANIA.

FISH-CUTTER.

SPECIFICATION forming part of Letters Patent No. 266,134, dated October 17, 1882.

Application filed July 22, 1882. (No model.)

*To all whom it may concern:*

Be it known that I, JAMES B. GRADY, a citizen of the United States, residing at Philadelphia, in the county of Philadelphia and State of Pennsylvania, have invented certain new and useful Improvements in Fish Cutters and Flakers; and I do hereby declare the following to be a full, clear, and exact description of the invention, reference being had to the accompanying drawings, which form part of this specification, in which—

Figure 1 is a sectional view of cutter. Fig. 2 is a side view of same. Fig. 3 is an end view of same, partially in section. Fig. 4 is a top view. Fig. 5 is a perspective view of a part of the machine, and Figs. 6 and 7 are perspective views of the turner and deflector used in connection therewith.

My invention has relation to a machine for removing the heads and tails of fish as a preliminary step in the process of preparing them for boxing.

The usual method of preparing the fish by hand is as follows: The fish are brought to the operating-table in baskets, crates, &c., where they are to be laid out in regular rows. The operator then removes the heads and tails with a knife, after which the fish are carried to the flakes or drying-dishes. The removal of the heads and tails is a very laborious piece of work, and even when performed by a skillful workman is far from being as well done as by my machine. In preparing the fish for boxing it is necessary that none of them should be over a certain size, the boxes being all of a standard size. If the fish are longer than the standard, they will not pack well, and they must be either trimmed by the person employed in boxing or else returned to the cutting-table. If a gage is used by the cutter, it takes much longer time to dress and prepare the fish.

My invention has for its object the provision of means whereby the fish are carried from a series of hoppers and automatically delivered by a system of elevators and endless belts to a series of pairs of saws or other suitable cutting apparatus, which remove their heads and tails, after which they are delivered into a suitable receptacle or receptacles, from which they may be moved as desired for further manipulation.

Referring to the accompanying drawings, A is a hopper, trough, or chute in which the fish are placed as they come from the water. This trough or chute has an opening, $a$, at its lower end, through which the fish pass, and are taken up by the shelves or lips $b$ on the endless apron or belt B, moving on the pulleys or rolls $b'$ $b^2$. These lips or shelves are made of such size and shape that they will only take up and hold one fish at a time. The fish are carried by the apron or belt to the top of the roll or pulley $b'$, where they drop off and fall into the trough C, which is wider at the top than the bottom, and has running through it, at its bottom, the endless belt D, moving on the pulleys $d$ $d'$. The fish are thrown into the trough or hopper C crosswise; but the hopper or trough being V-shaped, they fall on the belt or carrier lengthwise. They are then carried by the belt D forward toward the pulleys $d'$, under which are placed the saws or cutters I I' for removing the heads and tails; but as it is necessary that all the fish should arrive at the saws with their heads on the same side of the belt, or with their heads toward the larger saw, I place the gate E over the belt or apron D. This gate is placed at an angle over the belt, with its lower edge very near to but not in contact with the belt D, and it is held in place by the arms or shaft $ee$, passing through the sides of the trough C, it is also held down by a spring or its equivalent. When the fish are moving on the belt with their tails forward, or in the direction of the pulleys $d'$, the tail acts as a wedge or lever and raises the end of the gate E and allows the fish to pass under it. If, on the contrary, they approach the gate heads forward, the head strikes against the edge of the gate and the fish slides up and over the gate and is thrown into or against the lower end of the semicircular-shaped turner F. The momentum carries them partially around the circumference of the inner side of this turner, when they fall back on the belt D behind the gate E, having been turned in an opposite direction from what they were when they met the gate E. By this arrangement all the fish are carried tails forward, after either going over or under the gate E. From there they are carried forward to the pulley $d'$. At this point is placed what I call the "deflector," and which is intended to place the fish on the carrier or belt H, with the heads toward the saws or cutters I'. This deflector is made in the shape of a longitudinal section of a cone bent to a semicircle and having an extension or flattened side, $g$. The fish enter this deflector at its larger end, tail first, and, following the shape of the cone, the tail strikes the brush or stop $g'$. The head slides along the flattened side and the fish drops on the belt with the head toward the saw or cutter I'. The belt H moves on the pulleys $h\ h'$ in the direction of $h$, and it also runs under the pulley $d'$ and belt D. The fish are carried by the belt H forward and under belt D and pulley $d'$, which hold it in position while the saws or cutters I I' remove the heads and tails. They are then carried forward by the belt H and deposited in the box K, from whence they may be removed from time to time and cleansed of their entrails, or otherwise further prepared for boxing.

While I have described but a single set of delivery-belts, cutters, &c., it is obvious that the system may be repeated or multiplied to any desired extent in a single machine, and I have shown in Fig. 4 of the drawings a number of elevators, turners, deflectors, and other appliances arranged together side by side in the same frame. In this arrangement the corresponding saws and rollers in each system receive motion from a single shaft running through the frame from side to side. These shafts, being provided with pulleys at their outer ends and with suitable belts for communicating motion to one another, are all actuated by belts from the power-shaft, as shown in Figs. 1 and 2 of the drawings.

What I claim as my invention is—

1. In a machine for dressing fish, the combination of the hopper A, the elevator-belt B, provided with buckets $b$, chute C, endless belts D and H, with their pulleys $d\ h$ and $d'\ h'$, and knives I and I', substantially as shown and described.

2. In a machine for dressing fish, the combination of the endless belt or carrier D, pulleys $d\ d'$, swing-gate E, deflectors F and G, chute C, and the cutters I and I', substantially as shown and described.

3. In a machine for dressing fish, the combination of the endless belts D and H, with their pulleys $d\ h$ and $d'\ h'$, and the cutters I I' on each side of the belt, with the chute C and deflector G, whereby the fish are delivered sidewise to the cutters, substantially as shown and described.

4. In a machine for dressing fish, the combination, with the chute C and carrier D, of the inclined gate E and curved deflector F, whereby the position of the fish on the carrier is automatically regulated, substantially as described.

5. In an apparatus designed to prepare and dress fish by mechanical means, a deflector made, substantially as described, as the longitudinal section of a cone or conoid, and having a flattened side or projection, and adapted to alter the relative position of the fish while descending from one carrier to another carrier parallel to it.

In testimony that I claim the foregoing I have hereunto set my hand this 20th day of July, 1882.

JAMES B. GRADY.

Witnesses:
JOHN C. GRADY,
CHAS. C. GUYGER.